United States Patent [19]

Smith, III et al.

[11] Patent Number: 5,043,646
[45] Date of Patent: Aug. 27, 1991

[54] REMOTE CONTROL DIRECTION SELECTING SYSTEM

[75] Inventors: Jay Smith, III; Daniel J. Schmieder, both of Los Angeles, Calif.

[73] Assignee: Smith Engineering, Culver City, Calif.

[21] Appl. No.: 517,368

[22] Filed: May 1, 1990

[51] Int. Cl.⁵ .................. H04Q 7/02; G05D 3/10
[52] U.S. Cl. .................... 318/581; 318/16; 318/587
[58] Field of Search ........... 318/16, 580, 583, 581, 318/584, 587, 588

[56] References Cited

U.S. PATENT DOCUMENTS

| | | | |
|---|---|---|---|
| 2,419,970 | 5/1947 | Roe et al. | 318/16 |
| 2,490,768 | 12/1949 | Althouse et al. | 318/16 |
| 2,539,482 | 1/1951 | Rothschild | 342/398 |
| 2,705,793 | 4/1955 | Litchford | 318/581 X |
| 2,745,614 | 5/1956 | Bennett et al. | 244/184 |
| 2,826,380 | 3/1958 | Ketchledge | 244/184 |
| 2,866,930 | 12/1958 | Russell | 318/16 |

Primary Examiner—Bentsu Ro
Attorney, Agent, or Firm—Price, Gess & Ubell

[57] ABSTRACT

A remote control transmitter/receiver system wherein an absolute direction command may be issued by the transmitter and acted upon by the receiver. The transmitter and receiver both include a common reference direction so that an absolute direction command (i.e., relative to the common reference direction) may be issued and acted upon. In a preferred embodiment, the transmitter operates in accordance with an internal compass signal so that an absolute direction command relative to magnetic North can be generated by the transmitter. The receiver also functions in accordance with an internal compass signal so that an absolute direction command transmitted to the receiver can be effected. The transmitter and receiver may be microprocessor controlled, and the internal compass signal may be generated with an electronic flux gate compass. The invention may be used in place of the conventional remote control systems that are used with hand-held transmitters and hobby vehicles.

9 Claims, 4 Drawing Sheets

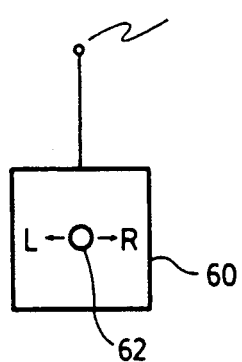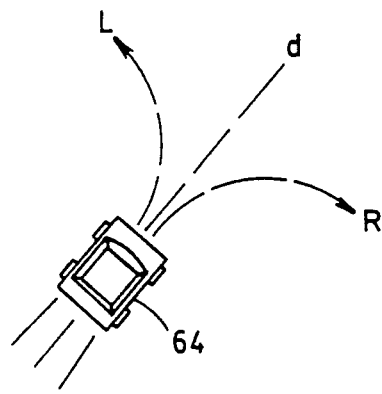
FIG. 1
PRIOR ART
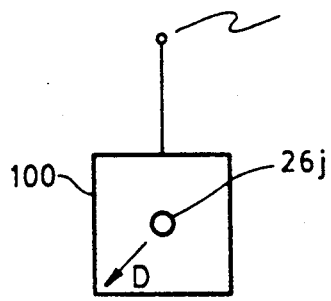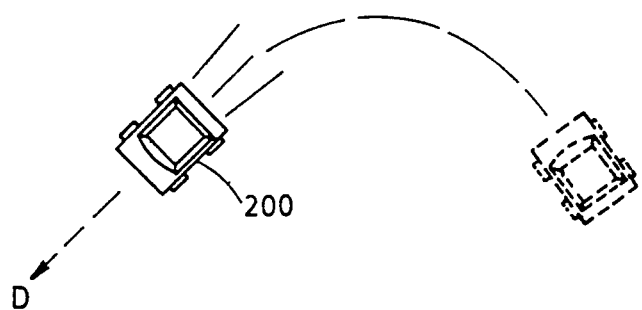
FIG. 2a
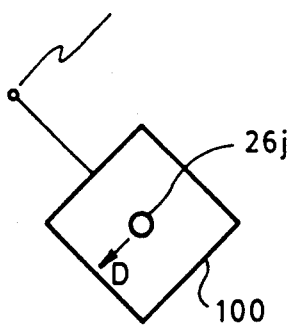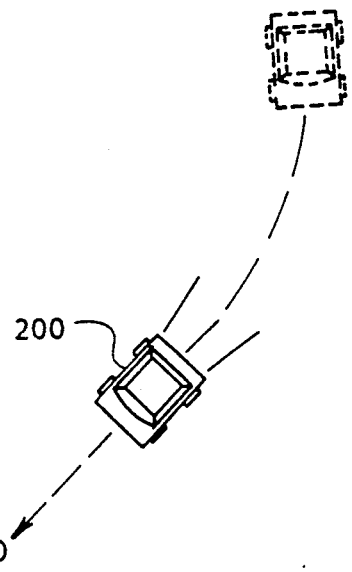
FIG. 2b

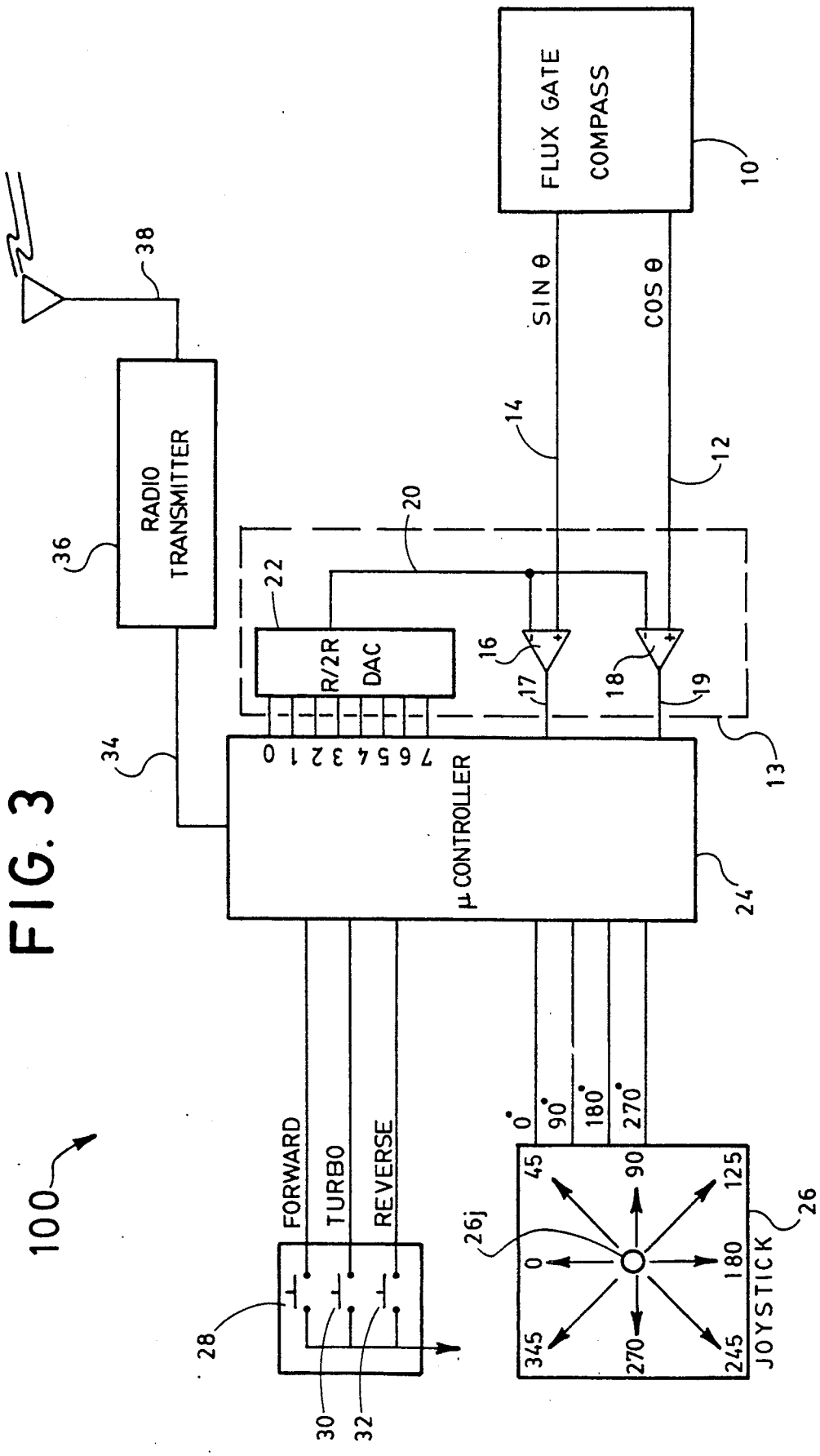

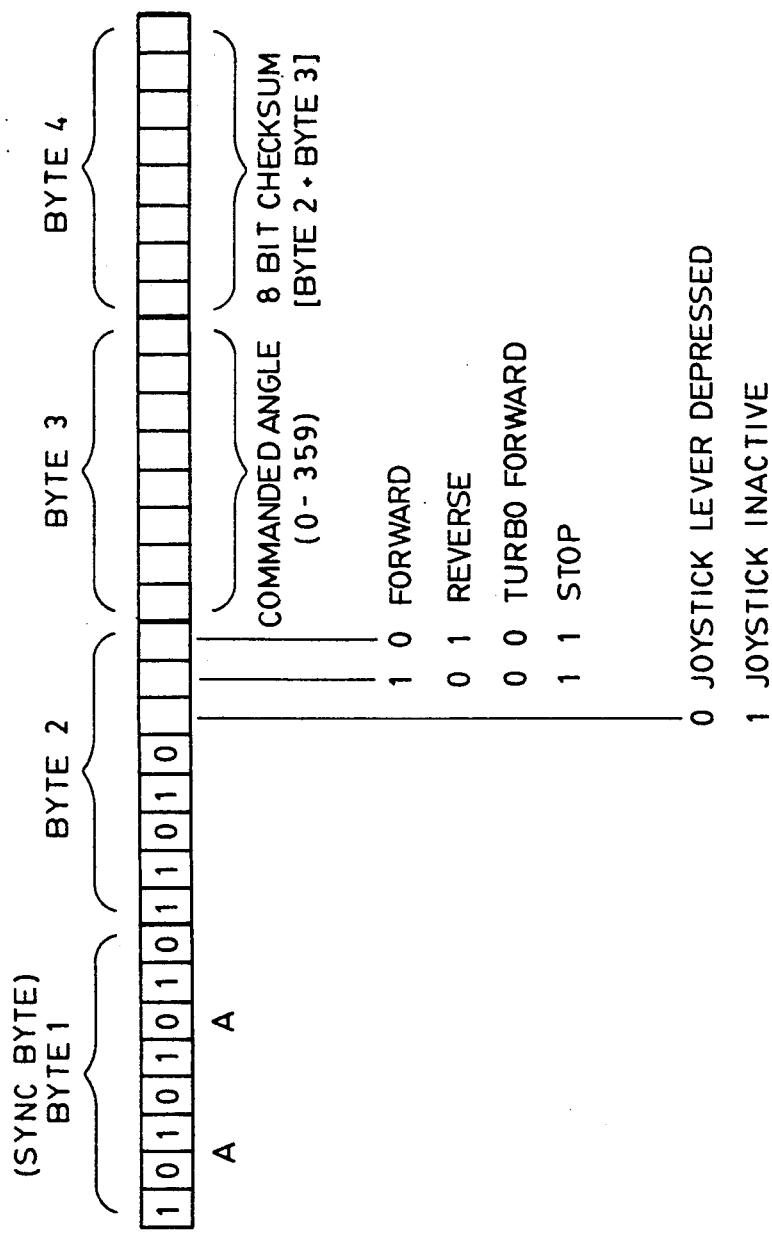

REMOTE CONTROL DIRECTION SELECTING SYSTEM

BACKGROUND OF THE INVENTION

1. Field of the Invention

The present invention relates generally to remote control systems where a user selects and transmits a direction control signal from a remote control transmitter to a remotely controlled device. More particularly, the present invention relates to an improved remote control system where the user may select a desired direction relative to an external reference direction without considering the orientation of the remote control transmitter or the remotely controlled device relative to the external reference direction.

2. Description of the Prior Art

There are many known varieties of remote control systems. Probably the first to come to mind are those used with hobby vehicle systems such as remote control planes, boats, cars, etc.

A typical prior art hobby vehicle system consists of a remote control transmitter that includes a user-operated means for selecting either "left" or "right" and for transmitting a direction control signal in response to the user selection and a remotely controlled vehicle (car, boat, plane, etc.) that responds to the transmitted direction control signal. For example, a radio controlled car is comprised of a car that may be commanded to turn left or right and a remote control transmitter from which the user may select and transmit left or right direction control commands. A typical direction selecting means consists of a joystick that may be moved either left or right relative to the remote control device. Ordinarily, the user must continuously hold the joystick in the selected direction during the entire time that the vehicle is turning and then release the joystick to end the turn.

The prior art remote control systems are burdened by the fact that the resulting direction of the vehicle is based on factors that are constantly changing relative to the user and the remote control transmitter, namely the position and direction of the vehicle. Since the position and direction of the remotely controlled vehicle are constantly varying relative to the user, the resulting direction of the vehicle, relative to the user, is also constantly varying.

Given a remote control car, for example, if a user selects and transmits a "left" or "right" direction control signal when the car is travelling radially away from the user, the resulting direction of the car, relative to the user, will correspond to the transmitted direction control signal. More specifically, if a "left" command is transmitted, the car will travel left relative to its direction and position and also relative to the user.

However, if a "left" or "right" direction control signal is transmitted to the car when it is travelling radially towards the user, the resulting direction of the car, relative to the user, is inversely related to the transmitted direction control signal. Under these circumstances, if a "left" command is transmitted, the car will travel left relative to its direction and position but will travel right relative to the user.

It can be seen from the above description that the user with an ordinary radio control system must always be conscious of the position of the vehicle and the direction that it is travelling, both before and during a turn, so that the user can rapidly engage in the mental acrobatics necessary to steer the vehicle.

SUMMARY OF THE INVENTION

It is an object of the present invention to provide a remote control transmitting device that is capable of transmitting a direction control signal that contains direction control information relative to an external reference direction;

It is a further object of the present invention to provide a remotely controlled device that includes a direction related feature, the direction related feature responding to a direction control signal that contains direction control information relative to an external reference direction;

It is a further object of the present invention to provide an improved remote control system wherein a direction control command takes effect relative to the position of a remotely controlled vehicle, but without regard to the direction that the vehicle is facing; and It is a further object of the present invention to provide an improved remote control hobby vehicle system that includes a remote control vehicle and a remote control transmitting device where the user is capable of selecting an absolute direction command and the remote control vehicle is capable of responding thereto.

The present invention achieves the above objects by providing a remote control transmitting device that comprises a first measuring means for measuring the orientation of the remote control transmitting device relative to an external reference direction, a second direction measuring means for measuring a user-selected direction relative to the remote control transmitting device, and a processing means for generating a direction control signal based on first and second component direction signals output by the first and second direction measuring means. The present invention further includes a remotely controlled device that includes a third measuring means for measuring the orientation of the remotely controlled device relative to the external reference direction and a means for controlling a direction related feature of the remotely controlled device based upon a component signal output by the third measuring means and a control signal received from a remote control transmitting device.

The features of the present invention which are believed to be novel are set forth with particularity in the appended claims. The present invention, both as to its organization and manner of operation, together with further objects and advantages thereof, may best be understood by referencing the following description in conjunction with the accompanying drawings.

BRIEF DESCRIPTION OF THE DRAWINGS

FIG. 1 a schematic representation of a prior art radio control vehicle system where a left or right direction control command transmitted by the remote control device is effectuated as a left or right direction control command relative to the position of the car and the direction in which the car is currently facing;

FIGS. 2a and 2b are schematic representations of a radio controlled vehicle system according to the present invention wherein a user-selected direction D is treated as an absolute direction command, independent of the orientation of the remote control transmitting device, the vehicle altering the current direction it is facing to travel in the selected direction;

FIG. 3 is a schematic block diagram of a remote control transmitting device according to the present invention;

FIG. 5 is a bit map of a digital command sequence transmitted by the remote control transmitting device.

DESCRIPTION OF THE PREFERRED EMBODIMENTS

Figure 4:
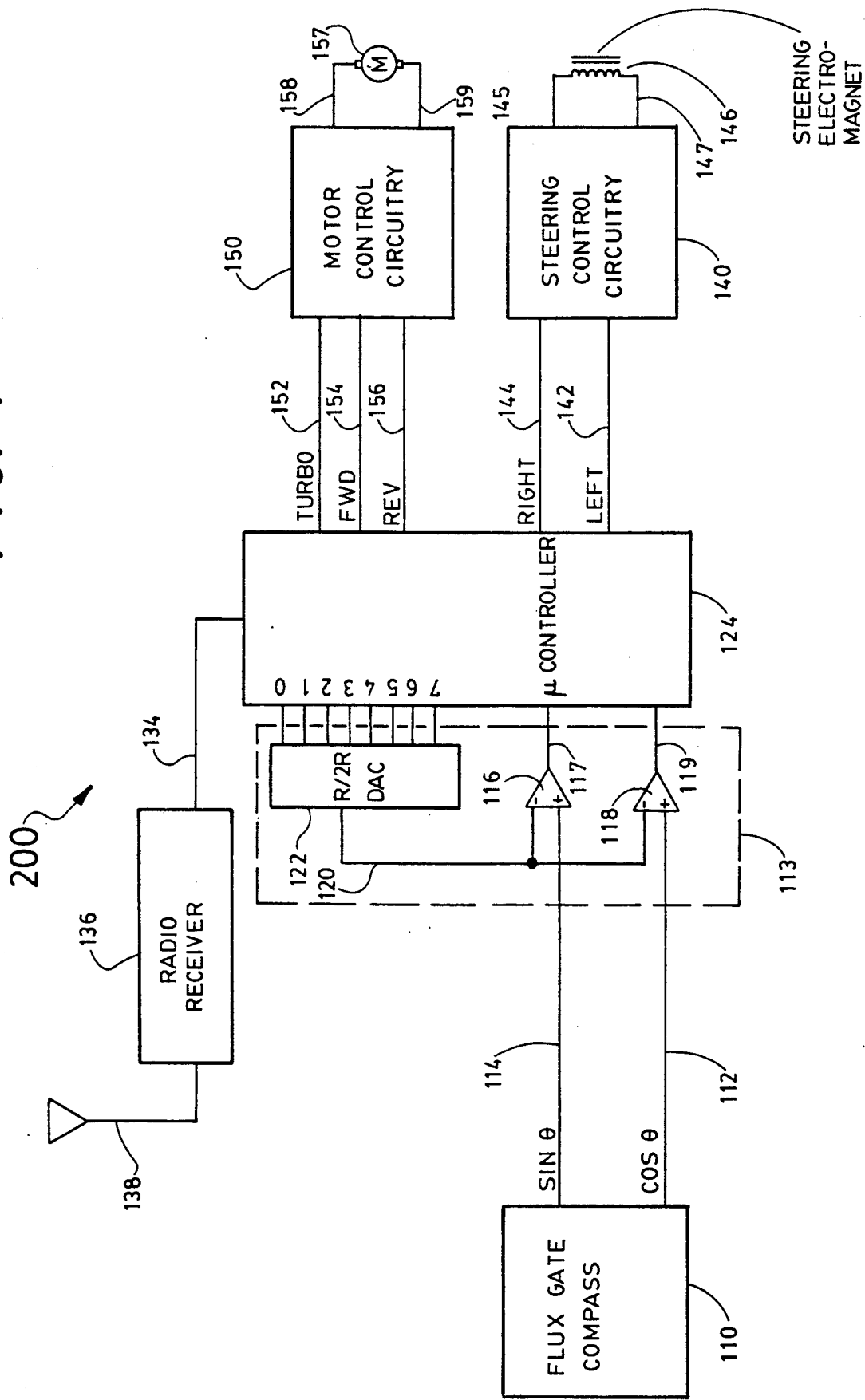
FIG. 4 is a schematic block diagram of a remote control receiving device according to the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved remote control direction selecting system.

The preferred embodiment of this invention is directed towards a remote control system that includes a hand-held remote control transmitter 100 and a small scale remotely controlled car 200 (see FIGS. 2a and 2b). The remote control transmitter 100 transmits control signals in response to various user-manipulated control switches. Typical control switches include a forward-/reverse switch, a "turbo" switch for temporarily increased speed, and a direction control switch such as a joystick 26j. The remotely controlled car 200 is typically controlled with left/right and forward/reverse signals that are activated in accordance with control signals transmitted by the remote control transmitter.

In the prior art remote control systems, the user is limited to only a left and a right direction control. As shown in FIG. 1, a prior art remote control transmitter 60 might have a joystick shaft 62 that can be moved left or right or, alternatively, separate left and right direction control buttons (not shown). The disadvantage of such a remote control transmitter 60 is that a user's left or right selection is effectuated relative to the position of the car and the direction (d) that the car is facing rather than relative to the user or some external reference direction. Thus, the user must first mentally consider what direction the car is travelling before selecting left or right. Moreover, the user must constantly consider the relationship between the direction of the car and the selected direction throughout the entire turn and must release the joystick shaft 62 as soon as the car has turned into the desired direction.

The present invention offers a remote control system that transmits an absolute direction command (relative to magnetic north) so that the user can control the car without being concerned about the direction that the car is travelling prior to or while manipulating the direction controls, without being concerned about the orientation of the remote control transmitter 100, and without having to release the joystick shaft at the precise moment that the car has achieved the desired direction.

FIG. 3 is a schematic block diagram of a preferred remote control transmitter 100 according to the present invention. The remote control transmitter is comprised of a microcontroller 24 that is provided with inputs from three momentary pushbutton control switches 28, 30, 32, an 8-position joystick 26, and a flux gate compass 10 (via an A/D converter 13). All of the components depicted in FIG. 3 would ordinarily be contained in a single hand-held housing like that schematically shown in FIG. 2a.

The primary purpose of the present invention is to allow the user to control the direction of the the car 200 by moving the shaft 26j of the joystick 26 towards any desired absolute direction. For clarity, all subsequent directions stated in degrees are to be taken relative to magnetic North. For example, East will be stated as 90° and West will be stated as 270°.

Ordinarily, a user of the present invention would select a desired direction without knowing or even being concerned with how the desired direction relates to magnetic North. More specifically, the user would simply select a direction in which he or she wants the car to travel as if he or she were standing at the point where the car is currently located.

Referring still to FIG. 3, it can be seen that sine and cosine voltages 14, 12 are available as outputs from the flux gate compass 10. A suitable flux gate compass is the Micronta Automotive Electronic Compass sold by Radio Shack, Catalog No. 63-641. A detailed discussion of the operational details of the flux gate compass will be omitted because such devices are well known and their internal operation does not constitute a material portion of this invention except as herein explained.

Suffice it to say that the magnitude of the voltages present on the sine and cosine outputs 14, 12 correspond to the sine and cosine of the earth's magnetic field, and that the data necessary to interpret the orientation of the flux gate compass and the remote control transmitter 100 is obtained by determining the ratio of the sine and cosine voltages. For this purpose, the sine and cosine voltages 14, 12 are provided to the microcontroller 24 via an 8-bit successive approximation A/D converter 13. As shown in FIG. 3, the A/D converter 13 is comprised of two comparators 16, 18. The sine and cosine voltages 14, 12 are provided to the noninverting inputs of the comparators 16, 18 and an R/2R 8-bit DAC ladder circuit 22 provides a variable analog reference voltage to the inverting inputs of the comparators. The microcontroller is programmed to determine the magnitude of the sine and cosine voltage 14, 12 by taking the 8-bit R/2R DAC 22 through a voltage progression while simultaneously monitoring the outputs 17, 19 of the two comparators.

The microcontroller determines the orientation of the flux compass by first dividing the absolute value of the sine voltage 14 by the absolute value of the cosine voltage 12 to obtain a tangent voltage, and by then using the tangent voltage as an index into an arctangent look-up table of 256 entries ranging from 0 to 90 degrees. The angle found in the arctangent look-up table is then expanded into one of four quadrants by taking into account the relative signs of the sine and cosine voltages 14, 12. The resultant angle represents the orientation of the remote control transmitter 100 and the flux gate compass from between 0 and 359 degrees relative to magnetic North.

The joystick 26 is an eight position 4-microswitch joystick. A suitable joystick is produced by Archer under the trade name Super-Deluxe Competition Joystick, Catalog No. 270-1703. The orientation of the joystick shaft 26j relative to the remote control transmitter 100 is communicated to the microcontroller 24 via four inputs lines labelled 0°, 90°, 180°, and 270°. The four input lines correspond to the joystick's four microswitches and provide a 45-degree resolution in that either a single or two angularly adjacent microswitches are closed and communicated to the microcontroller 24.

As further shown in FIG. 3, the remote control transmitter 100 is also comprised of the following control switches: a momentary contact forward control switch 28, a momentary contact turbo control switch 30, and a momentary contact reverse control switch 32. In the preferred embodiment, the forward and reverse control switches 28, 32 are combined in a single momentary rocker switch so that their operation is mutually exclusive. The compass 10 angle is added to the joystick 26 angle to provide an absolute, North-referenced angle to be transmitted.

The user selects a desired direction (D) with the joystick shaft 26j ("selected direction") while simultaneously depressing either the forward 28 or reverse switch 32. The absolute direction ("absolute" meaning relative to magnetic North) corresponding to the selected direction is obtained by summing the orientation of the remote control transmitter 100 relative to magnetic north with the orientation of the shaft 26j relative to the remote control transmitter 100. For example, if the user moves the joystick shaft 26j so that it is oriented 90° relative to the remote control transmitter 100 while holding the remote control transmitter 100 so that it is oriented 60° from North, the user has selected an absolute direction of 150° relative to North. A direction control signal containing information about the absolute direction relative to magnetic North can then be provided to an ordinary radio transmitter 36 via line 34 and then transmitted over antenna 38 to the car 200.

In the preferred embodiment, the direction control signal is part of a digital command sequence of four bytes (see FIG. 5). Byte 1 is a fixed sync byte (AA hex) that allows the microcontroller 124 in the car 200 to detect the beginning of a new digital command sequence. Byte 2 encodes the forward, turbo-forward, and reverse commands and also contains a single bit that indicates that the joystick handle 26j has been depressed to initiate a turn. Byte 3 contains the direction control signal as a digitally encoded number that ranges from 0 to 359 degrees. The direction control signal corresponds to an angle relative to magnetic North. Byte 4 is a checksum of bytes 2 and 3, the digital command sequence being ignored by the car 200 if it determines that the checksum does not match (due to radio interference or the like).

Referring now to FIG. 4, the remote control receiver 200 is comprised of a microcontroller 124, a flux gate compass 110, a radio receiver 136, motor control circuitry 150, and steering control circuitry 140. The flux gate compass 110 is identical to the flux gate compass 10 used in the radio control transmitter 100. The flux gate compass 110 provides sine and cosine voltage outputs 114, 112 that vary based on the orientation of the compass 110 relative to magnetic North. The sine and cosine voltages 114, 112 are provided to microcontroller 124 via A/D deconverter 113. The operation of A/D converter 113 is identical to that of A/D converter 13, earlier described, and its description will therefore be omitted.

The radio receiver 136 receives digital command sequences transmitted by the remote control transmitter 100 via antenna 138. Digital command sequences so received are provided by the radio receiver 136 to the microcontroller 124 on line 134. Once a command sequence has been received by microcontroller 124, and if the checksum test passes, then the digital command sequence is processed. For example, if the car is in motion, and the appropriate Byte 2 indicates that a joystick command has been received, then microcontroller 124 will read the flux gate compass 110 to determine if a turn is required. If a turn is required, microcontroller 124 will determine which of two possible directions will result in the smallest angle of rotation. While the turn is in progress, microcontroller 124 will periodically read the flux gate compass 110 to determine when the car 200 has converged to the commanded angle (direction control signal) contained in byte 3.

The steering of the car is accomplished via a steering electromagnetic 146 that is controlled by the microcontroller 124 via left and right control lines 142, 144 and a steering control circuit 140. The steering control circuit 140 is interfaced to the steering electromagnet 146 via lines 145 and 147. The precise operation of the steering control circuit 140 is not considered material to the present invention, and a detailed description thereof is therefore omitted.

Motion is imparted to the car 200 with an electric motor 157 that is controlled by microcontroller 124 in accordance with the pertinent portions of the digital command sequences. The microcontroller 124 communicates with a motor control circuit 150 via a "turbo" control line 152, an "FWD" control line 154, and a "REV" control line 156. The motor control circuit 150 is connected to the motor 157 via lines 158 and 159.

The direction of the car 200 can be controlled based upon the orientation of the car 200 relative to magnetic North and the direction control signal contained in the digital control sequence (Byte 3, FIG. 5), because the car 200, like remote control transmitter 100, contains a flux gate compass 110 for measuring the orientation of the car 200 relative to magnetic North.

Those skilled in the art will appreciate that various adaptations and modifications of the just-described preferred embodiment can be configured without departing from the scope and spirit of the invention. For example, the present invention is adaptable to other hobby vehicles such as planes and boats. Moreover, the present invention is generally applicable to any directional device that is remotely controlled. Therefore, it is to be understood that, within the scope of the appended claims, the invention may be practiced other than as specifically described herein.

What is claimed is:

1. An improved remote control device that includes a selecting means for allowing a user to select a user desired direction and a means for transmitting a direction control signal in accordance therewith to control a direction related feature of a remotely controlled device, the improvement comprising:

a first direction measuring means in the remote control device for measuring the orientation of the remote control device relative to an external reference direction and for outputting a first component signal representative thereof;

a second direction measuring means in the remote control device for measuring the user desired direction relative to the remote control device and for outputting a second component signal representative thereof; and a processing means for generating the direction control signal based on the first component signal and the second component signal, the direction control signal corresponding to the user desired direction relative to the external reference direction whereby the user selects the user desired direction relative to the external reference direction without regard to the orientation of the remote control device.

2. The improved remote control device of claim 1 where the external reference direction is magnetic north.

3. The improved remote control device of claim 1 wherein the first direction measuring means is comprised of a flux gate magnometer.

4. An improved remotely controlled device having a direction related feature that is controlled based upon a direction control signal received from a remote control device, the improvement comprising:

measuring means in the remotely controlled device for measuring the orientation of the remotely controlled device relative to an external reference direction and for outputting a component signal representative thereof wherein the measuring means is comprised of a flux gate magnometer; and means for controlling the direction related feature of the remotely controlled device based upon the direction control signal and the component signal whereby the direction related feature is controlled in a particular direction relative to the external reference direction based upon the direction control signal.

5. The improved remotely controlled device of claim 4 wherein the external reference direction is magnetic north.

6. A remote control hobby vehicle system comprising:

(1) a hand-held control device including:
      (a) selecting means on the hand-held control device for allowing a user to select a desired direction relative to an external reference direction;
      (b) a first direction measuring means for measuring the orientation of the selecting means relative to the hand-held control device and for outputting a first component direction signal;
      (c) a second direction measuring means for measuring the orientation of the hand-held control device relative to the external reference direction and for outputting a second component direction signal;
      (d) processing means for deriving a direction control signal that corresponds to the desired direction, the direction control signal being derived from the first and second component direction signals; and
      (e) transmitter means for transmitting the direction control signal; and (2) a hobby vehicle including:
      (a) receiver means for receiving the direction control signal;
      (b) a third direction measuring means for measuring the orientation of the hobby vehicle relative to the external reference direction and for outputting a third component direction signal;
      (c) control means for outputting a steering signal that is proportional to the difference between the direction control signal and the third component direction signal; and
      (d) steering means for steering the hobby vehicle in the desired direction in response to the steering signal.

7. The remote control hobby vehicle system of claim 6 wherein the selecting means is a joystick.

8. The remote control hobby vehicle system of claim 6 wherein the external reference direction is magnetic north.

9. The remote control hobby vehicle system of claim 6 wherein the selecting means is a joystick; the first direction measuring means is comprised of microswitches that are activated by the joystick; and the second and third direction measuring means are each comprised of a flux gate magnometer.

* * * * *